United States Patent [19]

Takayama et al.

[11] Patent Number: 5,286,100
[45] Date of Patent: Feb. 15, 1994

[54] ANTISKID CONTROL APPARATUS

[75] Inventors: Toshi Takayama, Nakakoma, Japan; Masaru Sakuma, Koblenz, Fed. Rep. of Germany

[73] Assignee: Tokico Ltd., Kanagawa, Japan

[21] Appl. No.: 926,551

[22] Filed: Aug. 6, 1992

Related U.S. Application Data

[63] Continuation of Ser. No. 574,650, Aug. 29, 1990, abandoned.

[30] Foreign Application Priority Data

Aug. 29, 1989 [JP] Japan .................. 1-222728

[51] Int. Cl.$^5$ .................. B60T 8/64
[52] U.S. Cl. .................. 303/111; 303/100; 364/426.02
[58] Field of Search .................. 303/100, 93, 103, 107, 303/108, 110, 111; 364/426.02, 426.03

[56] References Cited

U.S. PATENT DOCUMENTS

| | | | |
|---|---|---|---|
| 3,880,474 | 4/1975 | Scharlack | 303/110 |
| 3,918,766 | 11/1975 | Klatt | 303/20 |
| 4,735,279 | 4/1988 | Sato | 303/113 AP X |
| 4,758,053 | 7/1988 | Yasuno | 303/91 |
| 4,760,893 | 8/1988 | Sigl et al. | 303/109 X |
| 4,784,444 | 10/1988 | McCann et al. | 303/111 X |
| 4,805,103 | 2/1989 | Matsuda | 303/110 X |
| 4,924,394 | 5/1990 | Uchida et al. | 303/110 X |

FOREIGN PATENT DOCUMENTS

| | | |
|---|---|---|
| 56-28738 | 7/1981 | Japan . |
| 59-19863 | 5/1984 | Japan . |
| 1421634 | 1/1976 | United Kingdom . |

*Primary Examiner*—Robert J. Oberleitner
*Assistant Examiner*—Lee Young
*Attorney, Agent, or Firm*—Scully, Scott, Murphy & Presser

[57] ABSTRACT

The present invention comprises a modulator which controls the brake fluid pressure which is provided to the hydraulic systems which extend from the brake fluid pressure source to each wheel, and a controller which controls said modulator. The controller lowers the rate of the increase in brake fluid pressure in one of the wheels on the opposite right or left side of a wheel which is being antiskid controlled, and by thus operating the modulator and maintaining or decreasing brake fluid pressure, relaxes the conditions for the initiation of antiskid control. Concretely, it lowers the threshold values for the slip ratio and the deceleration in the wheel speed, which are used in the decision to initiate antiskid control.

11 Claims, 6 Drawing Sheets

FIG.4 (a) (PRIOR ART)
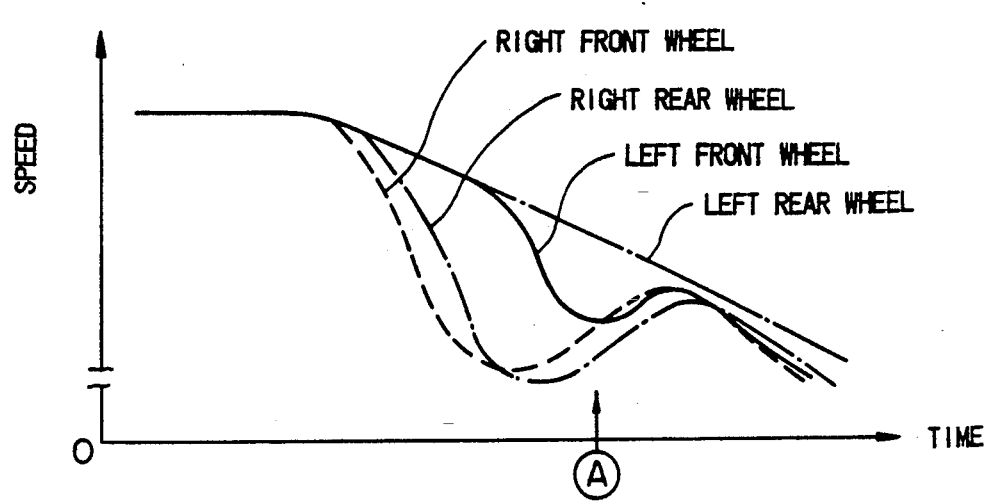
FIG.4 (b) (PRIOR ART)
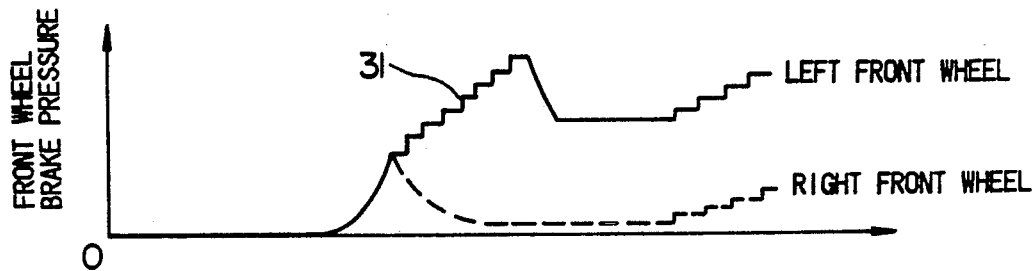
FIG.4 (c) (PRIOR ART)
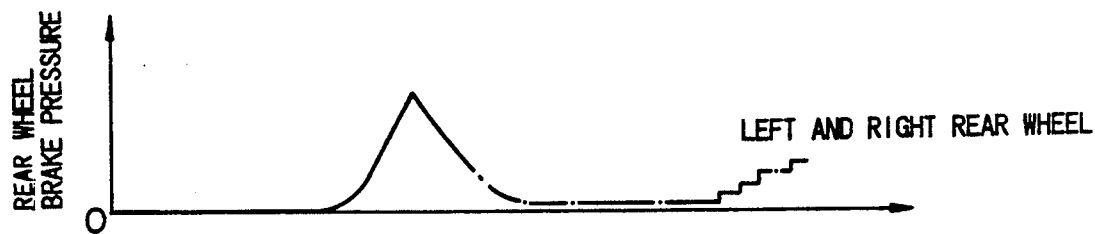

ANTISKID CONTROL APPARATUS

This is a continuation of application(s) Ser. No. 07/574,650 filed on Aug. 29, 1990, now abandon.

BACKGROUND OF THE INVENTION

1. Field of the Invention

The present invention relates to an antiskid apparatus and more specifically to an antiskid control apparatus which is intended to improve stability under road surface conditions of split $\mu$ in which the coefficients of friction of the road surfaces, with which the left and right wheels make contact, differ greatly.

2. Prior Art

Previously, the apparatuses disclosed in Japanese Patent Application, 2nd publication, No. 56-28738, and Japanese Patent Application, 2nd publication, No. 59-19863, have been used as antiskid control apparatuses which prevent wheel lock during vehicle braking.

In the antiskid control apparatuses disclosed therein, the presence or absence of a tendency to lock in each wheel is determined based on the measured value of the wheel speed (which means the speed of the rotating wheel), and the locking of any wheel which has a tendency to lock is prevented by controlling the rise in the fluid pressure of the hydraulic system of said wheel.

As a result of the freezing of one portion of the road, etc., the coefficient of friction of the road surface with which the right wheel makes contact, and the coefficient of friction of the road surface with which the left wheel makes contact, may differ greatly. In such cases, countermeasures are taken against vehicular spin caused by an imbalance in braking force. That is, the rise in the brake fluid pressure of the wheel which is opposite to the wheel which is on the side which is antiskid-controlled (for example, the right front wheel which opposes the left front wheel, or the left rear wheel which opposes the right rear wheel) is controlled, and the sudden occurrence of the yawing moment, which is the cause of spin, is controlled. By means of this, a steering margin is provided to the driver, which ensures driving stability.

The above-mentioned spin countermeasures have been primarily developed for full-sized vehicles (in general, long wheelbases are best-suited to nonswerving forward motion during braking). Therefore, in recent years the problem remained that antiskid apparatuses could not be applied to compact vehicles.

In general, compact vehicles which have short wheelbases are inferior in nonswerving forward motion during braking when compared with full-sized vehicles with long wheelbases. In addition, the load on the rear wheels of compact vehicles, which has an important role in maintaining direct nonswerving forward motion, is low. As a result of this, in the above-mentioned conventional antiskid control, there are cases in which spin countermeasures achieved by lowering the speed at which the yawing moment occurs cannot alone ensure sufficient driving stability.

SUMMARY OF THE INVENTION

It is an object of the present invention to provide reliable antiskid control which ensures driving stability under road surface conditions of split $\mu$ regardless of the type of vehicle to which it is applied.

In order to accomplish the above-mentioned object, the present invention provides an apparatus comprising a modulator which controls the brake fluid pressure provided in the respective hydraulic systems which connect the brake fluid source to each wheel, and a controller which controls said modulator. When any wheel is antiskid-controlled, said controller reduces the rate of increase in the brake fluid pressure in the wheels on the opposite (right/left) side of this wheel, and operating the above-mentioned modulator, relaxes the conditions under which antiskid control starts by holding (hereinafter, "holding" means to maintain) or reducing brake fluid pressure. Specifically, it reduces the threshold values of the slip ratio and the wheel reducing speed (wheel increasing speed) which are used to determine the start of antiskid control.

With the composition of this invention, sudden rises in braking power in wheels on the opposite side of wheels which are antiskid-controlled are suppressed under split $\mu$ road surface conditions, in which the wheels on either the left or the right side of a vehicle are in contact with a low $\mu$ road surface, while the wheels on the other side are in contact with a high $\mu$ road surface. Thus, the wheel in question is easily antiskid-controlled. As a result of this, extreme discrepancies in the braking power in the wheels on the right and left sides do not occur. Accordingly, a time margin for steering necessary to recover from a vehicular spin can be provided to the driver. Furthermore, since the threshold values which determine whether antiskid control will be begun in one of the front or the rear wheels of the opposite side are lowered, and antiskid control can be easily accomplished, the lateral force of the wheels on the other side is ensured. Accordingly, the yawing moment which occurs as a result of the difference in the coefficients of friction of the left and right side wheels in the direction of advance is overcome and vehicular spin can be reliably prevented by means of this lateral force.

In addition, in another aspect of this invention comprising a modulator, which controls the brake fluid pressure provided in the respective hydraulic systems which connect the brake fluid source to each wheel, and a controller which controls said modulator, when any wheel is antiskid-controlled, the above-mentioned controller reduces the rate of increase in the brake fluid pressure in the front and rear wheels on the opposite side of this wheel and relaxes the conditions under which antiskid control of the front and rear wheels of the opposite side is initiated.

With the composition of this invention since the front or rear wheel which is not antiskid-controlled (in other words, the wheel which has a sufficient road surface coefficient of friction) is safely in an antiskid-controlled state, a larger lateral force can be ensured. Consequently, vehicular spin can be reliably prevented by means of the lateral force ensured by those wheels which do not have a tendency to lock.

BRIEF DESCRIPTION OF THE FIGURES

FIGS. 4A–C are a graph showing the changes in the speed of the wheel, front wheel brake pressure, and rear wheel brake pressure during antiskid control using an apparatus according to the prior art.

DETAILED DESCRIPTION OF THE PREFERRED EMBODIMENTS

Hereinafter, the embodiments of the present invention will be explained with reference to the Figures.

Figure 1:
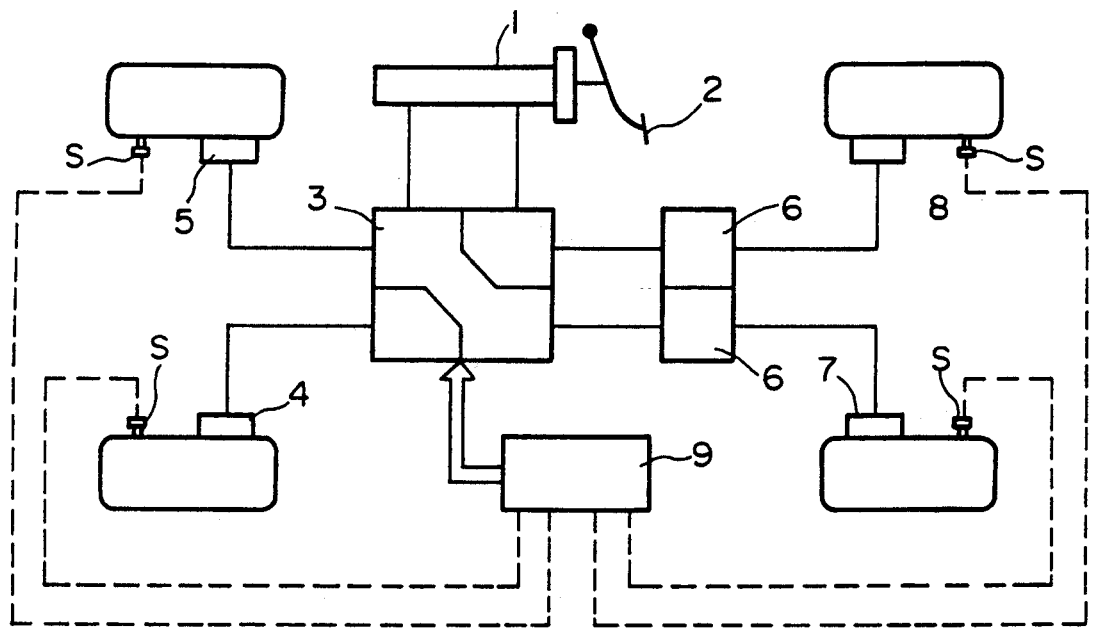
FIG. 1 is a hydraulic diagram of the brake fluid pressure system.
Figure 2:
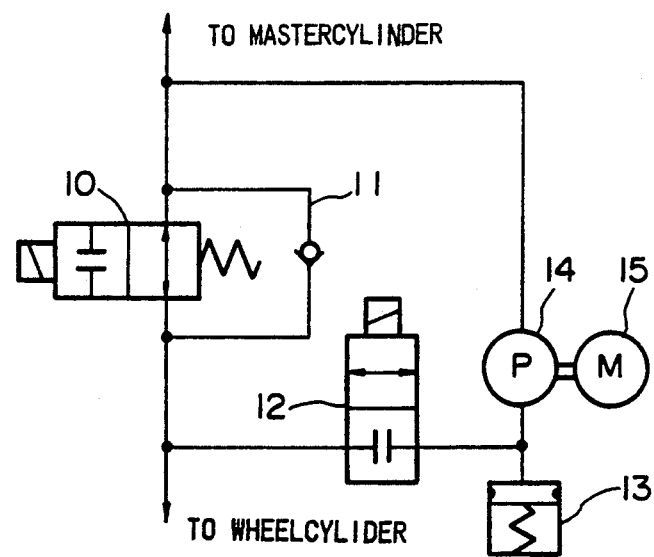
FIG. 2 is a hydraulic diagram showing the construction of the modulator.

First, the overall composition of the antiskid control apparatus will be explained with reference to FIGS. 1 and 2.

Numeral 1 is the master cylinder. This master cylinder 1 generates brake fluid pressure by means of the force of the driver's foot on brake pedal 2. The fluid pressure produced by this master cylinder 1 is supplied to left and right front wheel brakes (the wheel cylinders) 4 and 5 through the medium of modulator 3, and is supplied to left and right rear wheel brakes (the wheel cylinders) 7 and 8 through the medium of proportioning valve 6 (hereinafter, "proportioning valve" will be used to denote a valve which controls fluid pressure). The above-mentioned modulator 3 is provided in each of the hydraulic systems leading from master cylinder 1 to wheel cylinders 4, 5, 7, and 8; it controls the rise in brake fluid pressure or carries out the process of the recovery of fluid pressure by means of a signal supplied by controller 9. The details of modulator 3 are stated hereinafter. The above-mentioned fluid pressure control valve 6 is provided in the hydraulic system leading from master cylinder 1 to rear wheel brakes 7 and 8 and limits the fluid pressure in said hydraulic system to a level below that of the fluid pressure in the hydraulic system of the front wheel brakes 4 and 5. By means of this, the front wheels tend to lock before the rear wheels during braking.

Wheel speed sensors S, which determine the speed of each above-mentioned wheel, are provided in each wheel. A control signal is supplied to modulator 3 from the above-mentioned controller 9 based on the wheel speed data obtained by these wheel speed sensors S. Prescribed antiskid control is performed by means of this control signal.

Next, the composition of an embodiment of each of the above-mentioned modulators 3 will be explained according to FIG. 2.

Numeral 10 is a switch valve which can be set to open and closed positions. The hydraulic system leading to each wheel cylinder 4, 5, 7, and 8 from master cylinder 1 can be opened and closed by means of this switch valve 10. A check valve 11 is provided in the above-mentioned switch valve 10. This check valve 11 permits fluid flow in the direction of master cylinder 1 when the switch valve 10 is in the closed position. A switch valve 12 is provided in a position parallel to that of the above-mentioned switch valve 10. This switch valve 12 opens and closes by means of a control signal supplied from the above-mentioned controller 9 to discharge fluid pressure in wheel cylinders 4, 5, 7, and 8 into reservoir 13. Numeral 14 indicates a pump which is driven by motor 15. This pump 14 is driven, based on a control signal supplied from the above-mentioned controller 9, in order to recover the fluid pressure which declined in the hydraulic system at the time of the antiskid control.

By using the above-mentioned composition, modulator 3 is set in the following manner.

a. When switch valve 10 is set to "open" and switch valve 12 is set to "closed," modulator 3 is in the increase pressure mode (reapply-mode under antiskid control).

b. When switch valve 10 is set to "closed" and switch valve 12 is set to "open," modulator 3 is in the decrease pressure mode (dump-mode).

c. When both switch valve 10 and switch valve 12 are set to "closed," modulator 3 is in the hold-mode.

The flow of the fluid in the piping between each wheel cylinder 4, 5, 7, and 8 and master cylinder 1 is controlled in the above-mentioned way.

The antiskid control which is carried out by means of the above-mentioned controller 9 computes, based on the signal supplied from each wheel speed sensor S, the wheel speed $R\omega$ or the acceleration $\dot{R}\omega$ (this has a negative value during deceleration) which is its differential value. Furthermore, it computes the slip ratio $\lambda$ from the above-mentioned wheel speed $R\omega$ and the simulated vehicle speed, which is established based on the change curve of wheel speed $R\omega$ during deceleration. For example, based on the results of a determination, based on the adjusted speed $R\omega$ and the slip ratio $\lambda$, of which of the braking circumstances of FIG. 1 stated hereafter is applicable, modulator 3 is set to the increase pressure, decrease pressure, or hold mode.

Fundamentally, in other words, when the slip ratio $\lambda$ increases past a prescribed threshold value, or the wheel speed decreases past a prescribed threshold value, the brake fluid pressure decreases, and further, when the slip ratio $\lambda$ is below a prescribed threshold value and the wheel speed has a tendency to accelerate, the brake fluid pressure increases.

TABLE 1

| Wheel Deceleration | | Increase Pressure | Increase Pressure | Increase Pressure | Increase Pressure |
|---|---|---|---|---|---|
| | −A | Increase Pressure | Increase Pressure | Hold | Decrease Pressure |
| | 0 | Increase Pressure | Hold | Decrease Pressure | Decrease Pressure |
| | +B | Hold | Decrease Pressure | Decrease Pressure | Decrease Pressure |

Slip Ratio⟶

As A and B represent positive values, in the case in which a deceleration is represented by −A, when the wheel has a +A value, the wheel speed is increasing, indicating a state of acceleration.

In the case in which the wheel speed rises at an acceleration above that prescribed (above A), according to the conditions in the above-mentioned Table 1, the wheel speed $R\omega$ is determined to have a recovery tendency, and the brake fluid pressure is raised irrespective of the slip ratio. In the case in which the wheel speed falls at a deceleration above that prescribed (above B), the wheel speed $R\omega$ is determined to be close to locking and the decrease pressure mode is selected. In other words, in Table 1, as the right lower part of the figure is approached, the locking tendency danger is determined to be remarkably high. In addition, as the left upper part is approached, the conditions are determined to be safe and locking is unlikely. A mode is selected in response to the result of this determination. The fluid pressure of the rear wheel wheel cylinders 7 and 8 can be controlled separately by their respective modulators. However, in the case of this embodiment, among the rear wheels, the fluid pressure of a wheel which has a locking tendency takes precedence, that is, the fluid pressure is controlled at an equal level by select-low control.

Next will be explained the components of the control which is carried out in the above-mentioned controller 9 as a spin countermeasure during braking.

Step 11

A determination is made whether or not one of the front wheels (in this embodiment, the right front wheel) is being antiskid-controlled; in the case of "YES," the controller proceeds to step 12, in the case of "NO," the controller proceeds to step 15. The determination whether a wheel is being antiskid-controlled or not is carried out for each wheel, and when the modulator of one wheel enters the decrease pressure mode, the flag which indicates that this wheel is being antiskid-controlled is set; by checking this flag, a determination whether or not the wheel is being antiskid-controlled is made. This flag is turned on (a state in which setting of the flag is possible) for example by the occurrence of a stop lamp switch signal which accompanies a stepping on the break pedal, and the disappearance of this signal or the stopping of the vehicle (when the speed signal from the wheel speed sensors S becomes zero) causes the flag to be reset to the starting state. It is permissible to enter into the hold mode the condition for the setting of the under-antiskid-control indicator flag rather than entrance into the decrease pressure mode.

Step 12

A determination is made whether or not the other front wheel (in this embodiment, the left front wheel) is being antiskid-controlled. In the case of "NO," the controller proceeds to the following step 13; in the case of "YES," the controller proceeds to the step 21 stated hereafter.

Step 13

The rate of the increase in the braking power of the left front wheel is lowered by the intermittent opening and closing of switch valve 10 and the step-form rises in fluid pressure which result. In the case in which the rate of the increase in braking power had previously been lowered, this setting is maintained.

Step 14

The threshold value (one or the other of the slip ratio or the rate of deceleration of the wheel or both) at which the fluid pressure begins to fall in the left front wheel is lowered. If the threshold value has been previously lowered, this value is maintained, as in the case of the previous step.

Step 15

In the case in which the right front wheel is not under antiskid control, a determination is made whether the left front wheel is under antiskid control or not; in the case of "YES," the controller proceeds to step 16, in the case of "NO," the controller proceeds to step 18.

Step 16

The rate of the increase in the braking power of the right front wheel is lowered.

Step 17

The threshold value at which the fluid pressure begins to fall in the right front wheel is lowered.

Step 18

In the case in which neither the left nor the right front wheels are under antiskid control, a determination is made whether the rear wheels are under antiskid control; in the case of "YES," the controller proceeds to step 19, in the case of "NO," the controller proceeds to step 21.

Step 19

The rate of the increase in the braking power of both front wheels is lowered.

Step 20

The threshold value at which the fluid pressure begins to fall in both front wheels is lowered.

By means of the processing involving steps 11–20, in addition to the control, identical to the prior art, in which the rate of the increase in the braking power of the front wheel on the other side of one of the front wheels which is under antiskid control is lowered, the threshold value at which the fluid pressure begins to fall under such conditions is lowered. In addition, in the case in which neither front wheel is under antiskid control, control is effected by lowering the rate of the increase in braking power of the front wheels and the threshold value at which fluid pressure begins to fall, depending on the antiskid control status of the rear wheels.

Step 21

A determination is made whether the rear wheels are under antiskid control or not; in the case of "YES," control is terminated, in the case of "NO," the controller proceeds to the following step 22.

Step 22

A determination is made whether at least one of the front wheels is under antiskid control or not; in the case of "YES," the controller proceeds to the following step 23, in the case of "NO," control is terminated.

Step 23

The rate of the increase in the braking power of both rear wheels is lowered.

Step 24

The threshold value at which fluid pressure begins to fall in both rear wheels is lowered.

In this way, even in the case in which the rear wheels are not under antiskid control, when one of the front wheels is under antiskid control, the rate of the increase in the braking power of both rear wheels and the threshold value at which the fluid pressure begins to fall are both lowered, and the rear wheels are thus easily placed in a state in which the effects of antiskid control are obtained.

Next, the behavior of a vehicle which is antiskid controlled under split μ conditions, in which the coefficients of friction of the right and left road surfaces differ, will be explained with reference to FIG. 4.

FIG. 4 shows road surface conditions in which the right side is a low μ surface (for example, an ice-covered road), and the left side is a high μ surface (for example, a dry asphalt road surface). At this time, with the control mechanism of the prior art (control which limits the rate of the increase in the braking power of the front wheel on the side opposite the side which is under antiskid control), as shown in FIG. 4(b), when antiskid control is begun as a result of the detection of a rapid decrease in the wheel speed of the right front wheel, the bake fluid pressure of the left front wheel is steadily increased in a step form as shown by Numeral 31 in the diagram, and the rate of the increase in braking force is lowered. However, as shown in FIGS. 4(b) and 4(c), as the brake pressure of the right front and right rear wheels rises rapidly in response to the stepping on brake pedal 2, the strong slipping tendency shown in FIG. 4(a) occurs.

Figure 5:
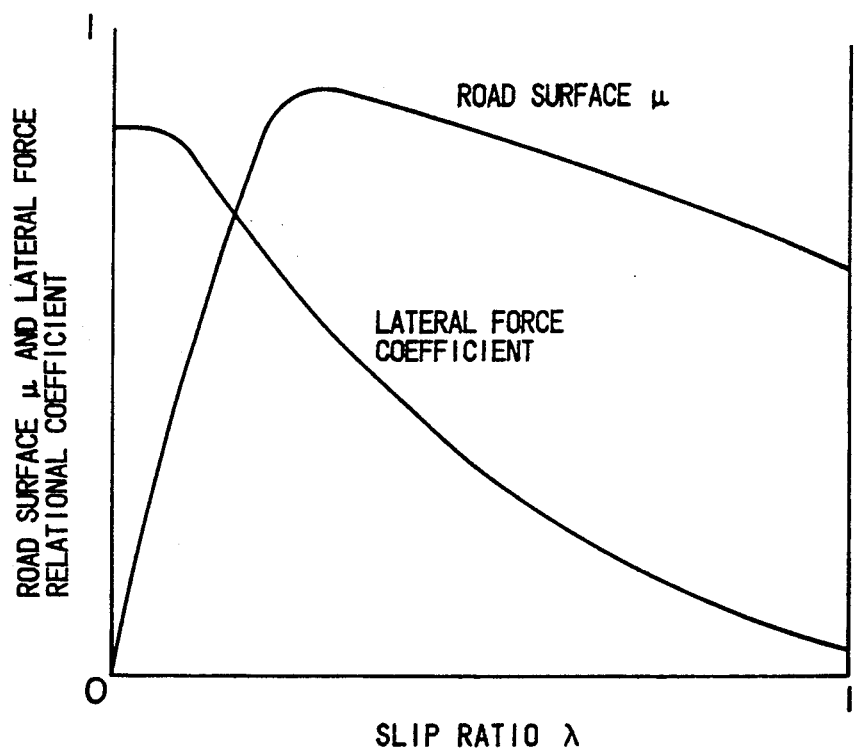
FIG. 5 is a graph showing the relationship between the slip ratio and the road surface coefficient of friction as well as the lateral force coefficient.

Generally, the relationship between the tires and the road surface shown in FIG. 5 exists.

In other words, though the coefficient of friction (road surface μ) in the direction of movement of the wheel reaches a peak value in the slip ratio λ range 0.05–0.3, the friction coefficient perpendicular to the direction of motion of the wheel (hereinafter called the lateral force coefficient), has a gradual tendency to decrease as the slip ratio λ increases. Accordingly, at the time indicated by the Ⓐ in FIG. 4, braking power is exhibited by each wheel in FIG. 6 according to the arrows 40a, 40b, 40c, and 40d (the appended letters a–d corresponding respectively to the left front wheel, right front wheel, left rear wheel, and right rear wheel). This results in the braking power in 40a–40d using a coupled force, and the yawing moment shown by the arrow 41 occurs at the center of the center of gravity 42 of the vehicle. However, in the case in which the lateral forces (same figure, shown by central arrows 43a–43d) opposing this yawing moment 41 are insufficient, the vehicle will begin to spin.

FIG. 4 shows the prior art control system in which the pressure increase for the wheels, which are not controlled by the antiskid control system, is delayed, and in which the increase in the yawing moment is delayed. However, this control is not sufficient, and if optimum steering actions are not taken, there is a possibility that vehicle spin will occur. In compact vehicles, the wheelbases are short, and the weight balance is displaced forwardly since the distance from the center of gravity 42 to the wheel axle is short. As previously stated, the load on the rear wheel is small and therefore the absolute value of the friction force is small between the road surface and the wheel. Accordingly, when yawing moment 41 is not sufficient to oppose lateral forces (shown by arrows 43c and 43d), the possibility of spin in particular becomes high.

In order to counteract this, in the control apparatus of the present invention, under the same road surface conditions described above, as shown in FIG. 7, control identical to that of the prior art, consisting of the initiation of a decrease in pressure in the right front wheel and a limit in the increase in the brake pressure in the left front wheel, is carried out. In addition, in the same way as with this type of control, by lowering the threshold value at which a fall in fluid pressure in the left front wheel begins, the left front wheel is easily placed in a state in which the effects of antiskid control are obtained. As a result of this, the slippage is kept small. If the decrease in pressure in the right front wheel has not been initiated, with regard to the rear wheels, by increasing the brake pressure in step form, the rate of the increase is lowered, and the threshold value at which the decrease in pressure is initiated is also lowered. Accordingly, the right rear wheel is easily placed in a state in which the effects of antiskid control are obtained, and the slippage can be kept smaller than in the case of the control according to the prior art.

Figure 6:
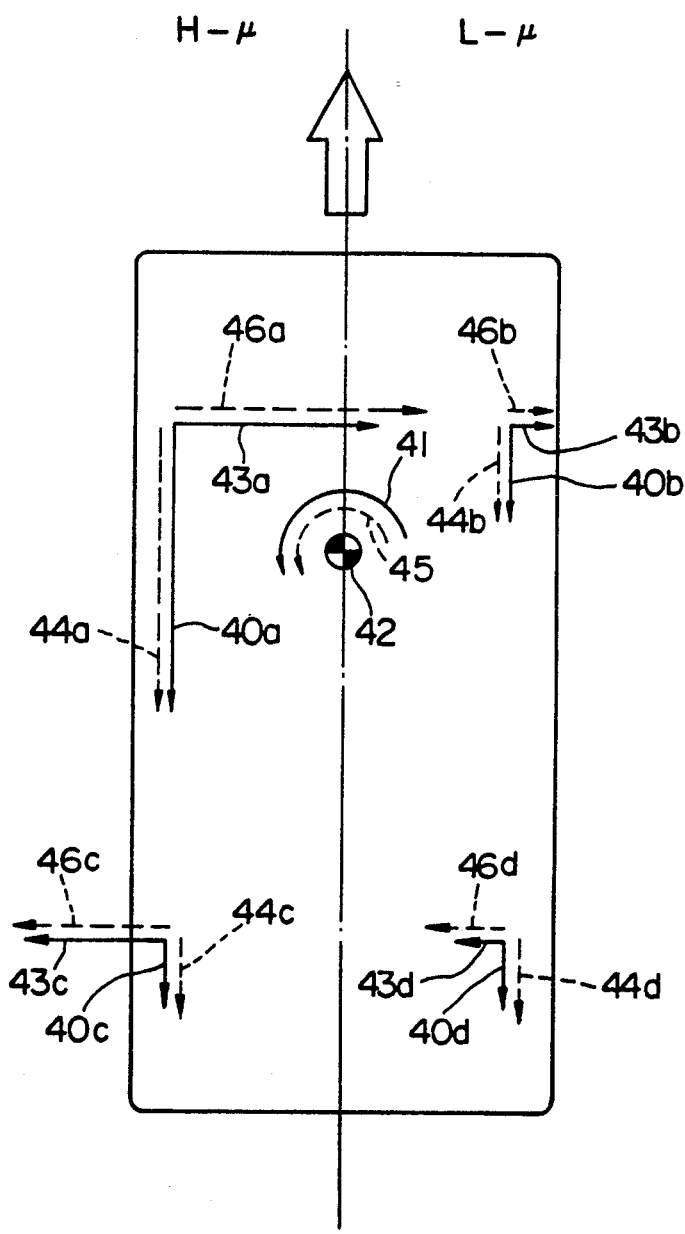
FIG. 6 is a plane figure showing the relationship between the yawing moment which is in effect in a vehicle during braking and the lateral force which resists this.
Figure 7:
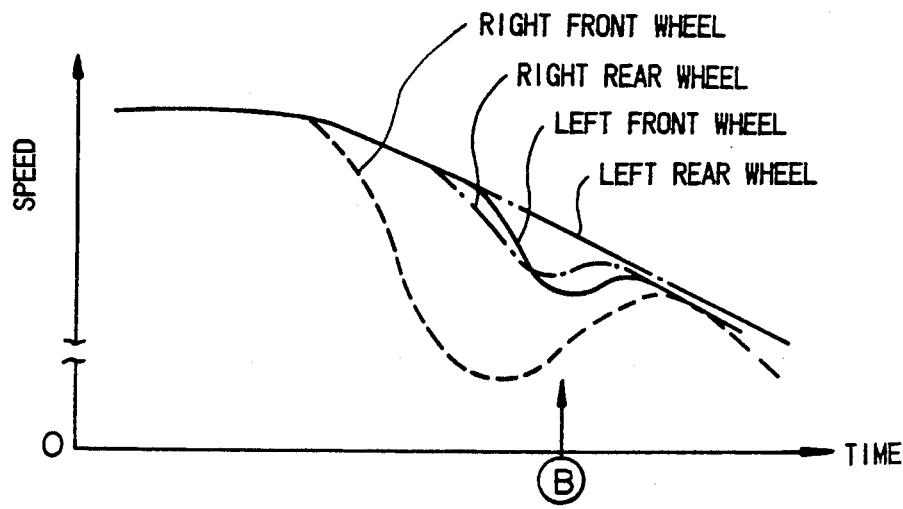
FIGS. 7A–C are a graph which shows the changes in the speed of the wheel, front wheel brake pressure, and rear wheel brake pressure during antiskid control using the present apparatus.
Figure 7:
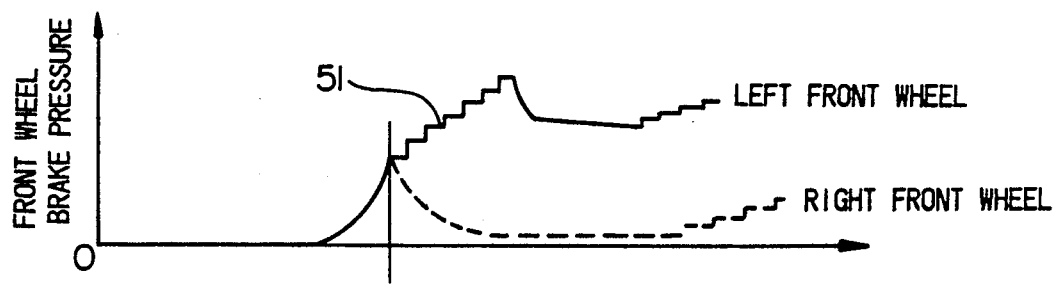
Figure 7:
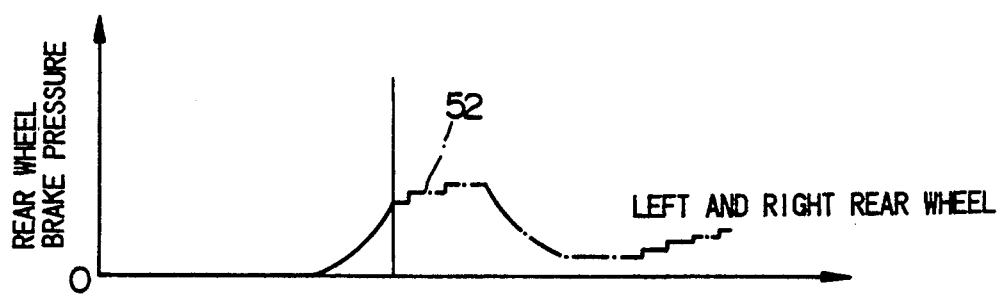

At the time indicated by the Ⓑ in FIG. 7, the braking power indicated by 44a–44d in FIG. 6 is applied to each wheel, and a yawing moment 45, which is almost equal to the yawing moment 42 of the prior art, is generated. However, by executing the above-mentioned control, lateral force is generated and increased in the three other wheels, in particular, the large lateral force indicated by 46a and 46d is generated in the left front and right rear wheels. The yawing moment 45 is easily counteracted by these lateral forces 46a and 46d.

Furthermore, by means of the above-mentioned control, in the case in which the rear wheels (for example, the right rear wheel) exhibits a locking tendency and neither of the front wheels lock, that is, when the rear wheels lock first, the threshold value at which the decrease in pressure in both front wheels is initiated is lowered. As a result, the lateral force of at least the front wheel on the side which is in contact with a road surface of high μ is ensured. Accordingly, it is possible to prevent vehicular spin by counteracting the yawing moment.

Modifications of the Above Embodiment

1. In the above-mentioned embodiment, the explanation concerned the case in which the apparatus switched among the "increase pressure," "hold," and "decrease pressure" modes according to the conditions in Table 1. However, the present invention can of course be applied in a case in which switching is carried out according to different conditions. With regard to the threshold values, in the case in which one or the other of the threshold values of the deceleration in wheel speed or the slip ratio, which are shown in the above-mentioned Table 1, are lowered; or in the case in which both or neither are lowered, it is possible to realize the object of ensuring the prescribed lateral force. In this case, the threshold values of the conditions for each mode selection shown in Table 1 are replaced by those shown in Tables 2 to 4 below.

TABLE 2

| Wheel Deceleration | | Increase Pressure | Increase Pressure | Increase Pressure | Increase Pressure |
|---|---|---|---|---|---|
| | −A | Increase Pressure | Increase Pressure | Hold | Decrease Pressure |
| | 0 | Increase Pressure | Hold | Decrease Pressure | Decrease Pressure |
| | +B | Hold | Decrease Pressure | Decrease Pressure | Decrease Pressure |

Slip Ratio ⟶

TABLE 3

| Wheel Deceleration | | | Slip Ratio → | | |
|---|---|---|---|---|---|
| | −A | Increase Pressure | Increase Pressure | Increase Pressure | Increase Pressure |
| | 0 | Increase Pressure | Increase Pressure | Hold | Decrease Pressure |
| | +B | Increase Pressure | Hold | Decrease Pressure | Decrease Pressure |
| | | Hold | Decrease Pressure | Decrease Pressure | Decrease Pressure |

TABLE 4

| Wheel Deceleration | | | Slip Ratio → | | |
|---|---|---|---|---|---|
| | −A | Increase Pressure | Increase Pressure | Increase Pressure | Increase Pressure |
| | | | | | Decrease Pressure |
| | 0 | Increase Pressure | Increase Pressure | Hold | Decrease Pressure |
| | +B | Increase Pressure | Hold | Decrease Pressure | Decrease Pressure |
| | | Hold | Decrease Pressure | Decrease Pressure | Decrease Pressure |

In Table 2, when there is a decrease in wheel speed and in the slip ratio, threshold value of the decreasing pressure mode entered into is smaller, and under these two conditions, the antiskid control is easier to fulfill. In Table 4, as the threshold value of the decrease in wheel speed was made smaller, the antiskid control is easier to fulfill with regard to this decrease in wheel speed.

2. In steps 14, 17, 20, or 24 of the above-mentioned control, the threshold value of the decision to enter the decrease pressure mode as a method of antiskid control was lowered. However, it is acceptable to lower the threshold value for entry into the hold mode instead. In this case, it is preferable to make either the threshold value for initiation of hold or the threshold value for the initiation of a decrease in pressure, or both, smaller under certain conditions and thus execute the above-mentioned steps 14, 17, 20, or 24. Primarily important is that a prescribed effect be obtained by lowering the threshold value for entry into an operational mode in which braking power does not increase, thus functioning as antiskid control. Furthermore, if the modes available for selection are limited to two, "increase pressure" and "decrease pressure," thus simplifying the apparatus and lowering the threshold value for entry into the "decrease pressure" mode under prescribed conditions, and switching between "increase pressure" and "decrease pressure" goes by way of "hold" mode and control thus carried out, a similar result can be expected.

3. In the above-mentioned preferred embodiment, control is carried out by decreasing the rate of increase in braking power in steps 13, 16, 19, or 23. However, it is not absolutely necessary to fix the extent of this decrease. For example, it is acceptable to appropriately regulate the extent of the decrease in proportion to the size of the increase or decrease in wheel speed or data which are calculated based on this size.

4. In the above-mentioned preferred embodiment, the case in which the rear wheels are select-low controlled was explained, but in the case in which there is no select-low control, the control of the present invention is of course effective.

Figure 3:
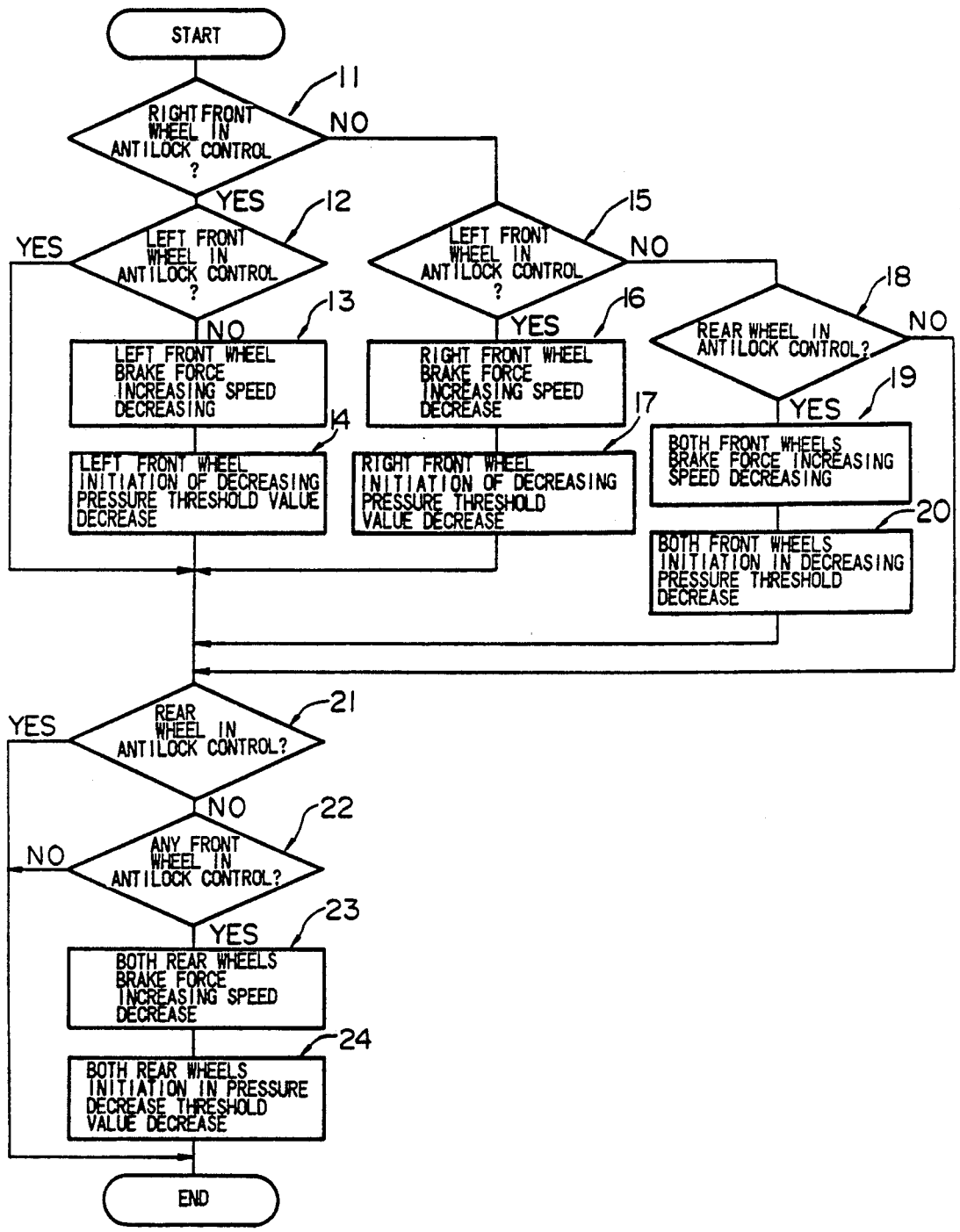
FIG. 3 is a flowchart of the procedure used to prevent spin.

5. As there are many cases of compact cars in which the load distribution on the front wheels is high, and as when step 19 in FIG. 3 is executed, a brake power deficiency results, step 19 may be omitted in order to ensure braking power.

What is claimed is:

1. An antiskid control apparatus for a vehicle having a relatively short wheel base including two front wheels, two rear wheels, and a brake system for selectively exerting a braking force on the wheels, wherein brake fluid is employed to transmit the braking force, and the center of weight of said vehicle being forwardly offset towards said front wheels, the antiskid control apparatus comprising:

a) wheel speed sensors for measuring the speed of the wheels, respectively;

b) a modulator for selecting a mode for each of the wheels, the mode being selected from an increase pressure mode, and at least one of a decrease pressure mode and a hold mode; the increase pressure mode increasing brake fluid pressure, the decrease pressure mode decreasing the brake fluid pressure, and the hold mode maintaining brake fluid pressure; and c) a controller for judging, with reference to threshold values, whether a wheel has a locking tendency based on wheel speeds; in the event a wheel evidences the locking tendency, initiating antiskid control for the wheel which evidences the locking tendency by controlling the selection of modes of the modulator so that one of the hold mode and the decreasing pressure mode is selected for the wheel which has the locking tendency, and selecting the increase mode after cancellation of the locking tendency, wherein said controller determines whether each of the front wheels is subjected to antiskid control, and upon said controller ascertaining that a first one of the front wheels which travels on road surface with a low coefficient of friction is under antiskid control and a second front wheel which travels on a road surface with a high coefficient of friction is not under antiskid control, said controller lowers the rate of the increase in brake fluid pressure in said second front wheel, and lowers the threshold value of the decrease pressure mode for the initiation of antiskid control corresponding to said second front wheel so that the second front wheel exhibits a reduced tendency to lock and a large side force is generated in the second front wheel.

2. An antiskid control apparatus in accordance with claim 1, wherein said at least one of the threshold values is a threshold value for the initiation of the decrease pressure mode.

3. An antiskid control apparatus in accordance with claim 1, wherein said at least one of the threshold values is a threshold value for the deceleration in wheel speed.

4. An antiskid control apparatus in accordance with claim 1, wherein said at least one of the threshold values is a threshold value for the slip ratio.

5. An antiskid control apparatus in accordance with claim 1, wherein said threshold values referred to by the controller are a threshold value for the slip ratio and a threshold value for the deceleration in wheel speed.

6. An antiskid control apparatus for a vehicle having a relatively short wheel base including two front wheels, two rear wheels, and a brake system for selectively exerting a braking force on the wheels wherein brake fluid is employed to transmit the braking force, and the center of weight of said vehicle being forwardly offset towards said front wheel, the antiskid control apparatus comprising:
 a) wheel speed sensors for measuring the speed of the wheels, respectively;
 b) a modulator for selecting a mode for each of the wheels, the mode being selected from an increase pressure mode, and at least one of a decrease pressure mode and a hold mode; the increase pressure mode increasing brake fluid pressure, the decrease pressure mode decreasing the brake fluid pressure, and the hold mode maintaining brake fluid pressure; and
 c) a controller for judging, with reference to threshold values, whether a wheel has a locking tendency based on wheel speeds; and in the event a wheel evidences the locking tendency, initiating antiskid control for the wheel which evidences the locking tendency by controlling the selection of modes of the modulator so that one of the hold mode and the decrease pressure mode is selected for the wheel which has the locking tendency, and selecting the increase mode after cancellation of the locking tendency,
 wherein said controller determines whether each of the front wheels is subjected to antiskid control, and upon said controller ascertaining that a first one of the front wheels which travels on a road surface with a low coefficient of friction is under antiskid control and a second front wheel which travels on a road surface with a high coefficient of friction is not under antiskid control, said controller lowers the rate of the increase in brake fluid pressure in the second front wheel and the rear wheels, and lowers the threshold value of the decrease pressure mode for the initiation of antiskid control corresponding to said second front wheel so that the second front wheel exhibits a reduced tendency to lock and a large side force is generated in the second front wheel.

7. An antiskid control apparatus in accordance with claim 6, wherein said controller further determines whether each of the rear wheels is subjected to antiskid control for the wheel, provided that said controller determines that neither of the rear wheels is under antiskid control, said controller lowers the rate of the increase in brake fluid pressure in both the rear wheels.

8. An antiskid control apparatus in accordance with claim 6, wherein said controller further lowers the threshold value of the decrease mode for the initiation of antiskid control corresponding to the rear wheels so that the rear wheels exhibit a reduced tendency to lock and the large side forces are generated in the rear wheels.

9. An antiskid control apparatus in accordance with claim 8, wherein said controller further determines whether each of the rear wheels is subjected to antiskid control, provided that said controller determines that neither of the rear wheels is under antiskid control, said controller lowers the rate of the increase in brake fluid pressure in the rear wheels and the threshold value of the decrease mode for the initiation of antiskid control corresponding to the rear wheels.

10. An antiskid control apparatus for a vehicle having a relatively short wheel base including two front wheels, two rear wheels, and a brake system for selectively exerting a braking force on the wheels wherein brake fluid is employed to transmit the braking force, and the center of weight being forwardly offset towards said front wheels, the antiskid control apparatus comprising:
 a) wheel speed sensors for measuring the speed of the wheels, respectively;
 b) a modulator for selecting a mode for each of the wheels, the mode being selected from an increase pressure mode, and at least one of a decrease pressure mode and a hold mode; the increase pressure mode increasing brake fluid pressure, the decrease pressure mode decreasing the brake fluid pressure, and the hold mode maintaining brake fluid pressure; and
 c) a controller for judging, with reference to threshold values, whether a wheel evidences a locking tendency based on wheel speeds; and if a wheel evidences the locking tendency, initiating antiskid control for the wheel which evidences the locking tendency by controlling the selection of modes of the modulator so that one of the hold mode and the decrease pressure mode is selected for the wheel which evidences the locking tendency, and selecting the increase mode after cancellation of the locking tendency,
 wherein said controller determines whether each of the front wheels is subjected to antiskid control, and upon said controller ascertaining that a first front wheel which travels on a road surface with a low coefficient of friction is under antiskid control and a second front wheel which travels on a road surface with a high coefficient of friction is not under antiskid control, said controller lowers the rate of the increase in brake fluid pressure in the second front wheel, and lowers the threshold value of the decrease pressure mode for the initiation of antiskid control corresponding to said second front wheel and at least one of the threshold values for the initiation of antiskid control corresponding to the rear wheels so that the second front wheel and the rear wheels exhibit a reduced tendency to lock and large side forces are generated in the second front wheel and the rear wheels.

11. An antiskid control apparatus in accordance with claim 10, wherein said controller further determines whether each of the rear wheels is subject to antiskid control, provided that said controller determines that neither of the rear wheels is under antiskid control, said controller lowers at least one of the threshold values for the initiation of antiskid control corresponding to the rear wheels.

* * * * *

UNITED STATES PATENT AND TRADEMARK OFFICE
CERTIFICATE OF CORRECTION

PATENT NO.   : 5,286,100
DATED        : February 15, 1994
INVENTOR(S)  : Tsohio Takayama, et. al.

It is certified that error appears in the above-indentified patent and that said Letters Patent is hereby corrected as shown below:

Title page, item [75], inventor:  should read--Toshio--.

Signed and Sealed this

First Day of November, 1994

*Attest:*

BRUCE LEHMAN

*Attesting Officer*     *Commissioner of Patents and Trademarks*